United States Patent [19]

Prince

[11] Patent Number: 4,999,262

[45] Date of Patent: Mar. 12, 1991

[54] MULTILAYER CATHODE CURRENT COLLECTOR/CONTAINER FOR A BATTERY

[75] Inventor: Lawrence S. Prince, Long Beach, Calif.

[73] Assignee: Hughes Aircraft Company, Los Angeles, Calif.

[21] Appl. No.: 512,290

[22] Filed: Apr. 20, 1990

[51] Int. Cl.$^5$ .............................................. H01M 4/36
[52] U.S. Cl. .................... 429/104; 429/245; 428/408; 428/661; 427/78
[58] Field of Search .................... 204/279, 280, 290 R, 204/290 F, 292, 294; 429/103, 104, 245, 211; 428/661, 408; 427/78

[56] References Cited

U.S. PATENT DOCUMENTS 3,307,925  3/1967  Jacobson ............................. 428/661
4,242,421  12/1980  Kudo ..................................... 429/46

Primary Examiner—John F. Niebling
Assistant Examiner—Kathryn Gorgos
Attorney, Agent, or Firm—Robert A. Westerlund; Steven M. Mitchell; Wanda K. Denson-Low

[57] ABSTRACT

A cathode current collector/container for use in an electrochemical battery cell, e.g., a Na/S battery cell, which includes an advantageously porous graphite first layer and a molybdenum second layer securely bonded to the graphite first layer, preferably by means of a chemical vapor deposition process. In a preferred embodiment, the cathode current collector/container further includes a third layer constituted of a structurally rigid, electrically conductive material, e.g., tantalum, securely bonded to the molybdenum second layer, preferably by means of a chemical vapor deposition process. Additionally, the cathode current collector/container may further include a protective coating of sealant material, e.g., pyrolitic graphite or carbon, deposited at least partially within pores of the porous graphite constituting the first layer. The cathode current collector/container may be embodied in either a tubular or planar structural configuration.

In the presently contemplated best mode of the present invention, the cathode current collector/container is a tubular structure comprised of a porous graphite tube having a thickness of less than approximately 10 mils; a molybdenum layer having a thickness within the range of approximately 3–10 mils, chemically vapor deposited on the inside of the graphite tube; and, a tantalum layer having a thickness within the range of approximately 8–12 mils, chemically vapor deposited on the molybdenum layer.

20 Claims, 1 Drawing Sheet

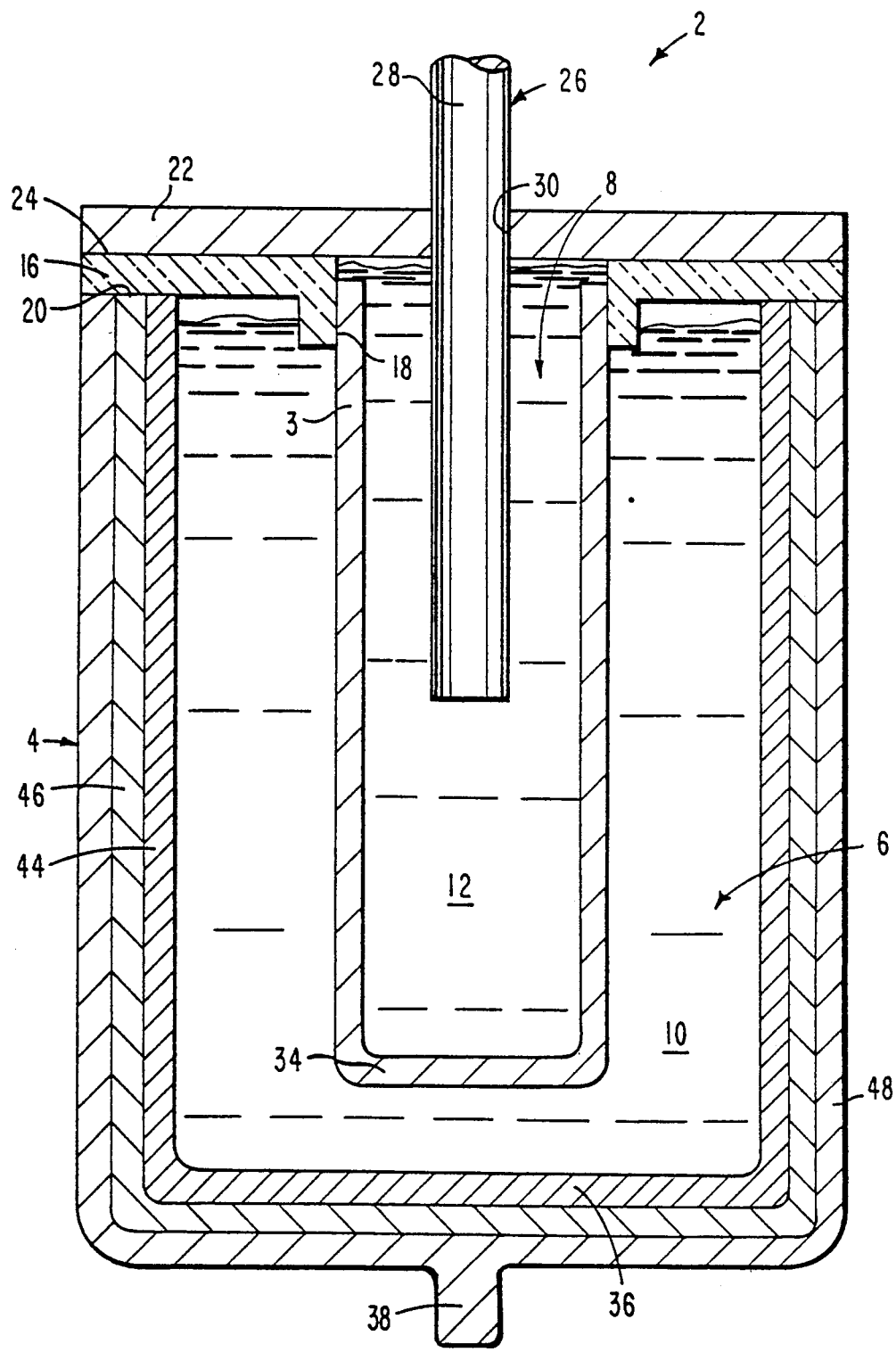

MULTILAYER CATHODE CURRENT COLLECTOR/CONTAINER FOR A BATTERY

FIELD OF THE INVENTION

This invention relates generally to the field encompassing electrochemical cells, and more particularly, to a multilayer cathode current collector/container particularly suited for use in sodium/sulfur cells.

BACKGROUND OF THE INVENTION

Most currently available sodium/sulfur cells utilize a chrome-plated stainless steel cathode container. Although chrome is a corrosion-resistant material, it has been found that chrome exhibits slow-rate corrosion in the hostile, highly-corrosive environment of sodium/sulfur (Na/S) cells. More particularly, presently available Na/S cells utilizing a chrome-plated stainless steel cathode container have typically only achieved cycle lives of 2,000 to 6,000 cycles in laboratory testing, and further, have exhibited degradation of performance of an extent which significantly limits the longevity or effective useful life of these Na/S cells to approximately 1,500 to 2,000 cycles. Because of these shortcomings, presently available Na/S cells are considered undesirable for certain applications, e.g., spacecraft applications, for which an elongated effective useful life and high performance are critical. For example, most satellite applications require cells or batteries which have a minimum 10-year service life over thousands (e.g., 30,000) of cycles, with little or no degradation in performance.

Over the past 20 years, the problem of cathode container corrosion in Na/S cells has been studied extensively, since cathode container corrosion has long been identified as a primary cause of cell performance degradation and, in some cases, cell failure. Regarding the use of chrome-plated, stainless steel cathode containers in Na/S cells, it has been discovered that there are two primary mechanisms responsible for the performance-degrading corrosion of these cathode containers. The first primary mechanism is sulfur/sodium polysulfide attack of the chrome coating which results in the formation of chrome sulfides which eventually spall off, thereby exposing portions of the stainless steel substrate/support structure. The chrome sulfides, in conjunction with iron and nickel sulfides which are formed when the stainless steel is exposed, greatly increase the cell impedance, thereby degrading cell performance commensurately. The second primary mechanism is formation of sodium thiochromate ($NaCrS_2$), which contaminates the electrolyte, which in turn, can cause cell failure. Nevertheless, although a great number of other materials have been evaluated for minimizing cathode container corrosion in Na/S cells, chrome is still generally considered to afford the best protection (at a feasible cost) against the highly corrosive, hostile environment present in Na/S cells, and thus, is the material currently employed as the primary form of corrosion protection in Na/S cells. Amongst the many other materials which have been evaluated for minimizing cathode container corrosion are transitional metal sulphides (e.g., iron sulfides), transitional metal carbides and nitrides, and graphite.

Although molybdenum and especially graphite have been found to exhibit superior resistance to sulfur and sodium polysulfide corrosion, and the requisite electrical characteristics, no feasible or effective technique for incorporating graphite and/or molybdenum within a cathode container structure has yet been derived or envisaged. For example, one approach, which is disclosed in U.S. Pat. Nos. 4,492,021 and 4,568,620, both issued to Wright et al., has been to isostatically press exfoliated graphite flake or grafoil (graphite foil) onto the interior surface of a metal substrate comprising the outer layer of a composite cathode container structure. This approach has resulted in an uneven graphite coating having marginal adhesion to the metal substrate, which has proven to be an ineffective long-term corrosion protection mechanism for the cathode container. Other approaches which have proven to be ineffective and/or infeasible for many cell applications, are taught in U.S. Pat. Nos. 3,959,013, issued to Breiter; 4,460,662, issues to Damrow et al.; and, 4,166,156 issued to Ludwig.

More particularly, the Breiter patent discloses a cathode container (for an Na/S cell) comprised of a metal substrate constituted of aluminum, steel, or iron-nickel-cobalt alloys having a layer of molybdenum or graphite adhered to the inner surface thereof. This proposed cathode container structure suffers from the following two major disadvantages:

(1) neither molybdenum nor graphite alone provide reliable, long-term corrosion protection for the container without unduly degrading cell performance; and, (2) the adhesive bond between either molybdenum or graphite and any of the above-delineated metal substrate materials is not sufficiently strong to withstand long-term thermal and mechanical loadings, particularly loadings of the type and magnitude experienced in spacecraft applications, thus rendering the container structure unduly susceptible to delamination and/or other types of structural flaws attributable to insufficient adhesion of the corrosion-resistant layer to the underlying metal substrate.

Of course, these flaws result in cell performance degradation and possibly cell failure due to exposure of the metal substrate to the cathodic reactants contained within the cell. This problem of insufficient adhesion of the corrosion-resistant material to the metal substrate material is at least partially attributable to a mismatch between the coefficients of thermal expansion of these materials.

The Damrow et al. patent attempts to solve the above-identified problems associated with the Breiter container by means of coating the molybdenum protective overlayer with a surface layer of a metal oxide, e.g., $MoO_2$. However, this container construction does not eliminate the previously discussed problem of insufficient adhesive bonding between the molybdenum and the metal substrate (e.g., aluminum), and therefore, although the Damrow et al. cathode container does exhibit better corrosion resistance than the Breiter cathode container, it does not provide the level of long-term corrosion resistance without performance degradation required for many applications, e.g., spacecraft applications.

The cathode container disclosed in the Ludwig patent, in one embodiment thereof, comprises a standalone graphite tube having a pyrolitic graphite coating deposited on its inner surface which is exposed to the cathodic reactant of the Na/S cell in which it is employed. Although this container structure provides superior corrosion resistance, it does not provide the level of corrosion resistance which could be obtained if a secondary corrosion resistant layer were employed in conjunction therewith. Further, this container structure suffers from the serious shortcoming that the structural strength and integrity of graphite is insufficient by itself to withstand severe mechanical loading conditions such as may be experienced in spacecraft applications. Further, if the graphite tube is made thick enough to provide structural support, it will exhibit high electrical resistance/impedance, which significantly adversely impacts the specific energy of the Na/S cell in which it is utilized. In another embodiment, the above-described cathode container structure is utilized as a liner within a metal container disposed in surrounding relationship thereto. Of course, this embodiment suffers from disadvantages and shortcomings similar to those discussed previously in connection with the Breiter and Damrow et al. cathode containers.

Based on the above and foregoing, it is clear that there presently exists a need for a cathode current collector/container for high energy density electrochemical cells, especially Na/S cells, affording greater corrosion protection and a longer service life than afforded by presently available Na/S cells, e.g., on the order of 10 years. More particularly, there is a need for a cathode current collector/container which overcomes the above-delineated shortcomings and disadvantages of presently available cathode current collector/containers utilized in Na/S cells or the like. The present invention fulfills this need.

SUMMARY OF THE INVENTION

The present invention encompasses a cathode current collector, for use in an electrochemical cell(e.g., a Na/S cell), which includes a first layer, constituted of graphite, and a second layer, constituted of molybdenum, securely bonded thereto. Advantageously, the graphite first layer is porous and the molybdenum second layer is securely bonded thereto by means of a chemical vapor deposition process. Preferably, the deposition process facilitates penetration of the molybdenum into the porous graphite through the pores thereof, to thereby effectuate a firmly adherent, tenacious, intimate bond between the graphite first layer and the molybdenum second layer. The graphite first layer constitutes the inner layer of this composite cathode current collector which is disposed in direct contact with the cathodic reactant (e.g. molten sulfur/sodium polysulfides) of the cell, and therefore, the graphite inner layer provides the primary corrosion resistance for the cathode current collector. The molybdenum second layer provides excellent secondary corrosion resistance for the cathode current collector.

In a preferred embodiment of the present invention, the cathode current collector further includes a third layer constituted of a structurally rigid, electrically conductive material, e.g., tantalum, securely bonded to the molybdenum second layer. Most preferably, the tantalum third layer is securely bonded to the molybdenum second layer by means of a chemical vapor deposition process. The third layer preferably provides sufficient structural strength to enable the cathode current collector to also serve as the cathode container for the cell in which it is incorporated. However, it is also within the purview of the present invention that a cathode current collector comprised of only the first and second layers have sufficient structural strength to enable the collector to also function as the cathode container for the cell.

Additionally, the cathode current collector of the present invention may further include a protective coating of sealant material, e.g., pyrolitic graphite or carbon, deposited at least partially within pores of the porous graphite first layer to thereby at least substantially close off these pores, in order to further ensure the corrosion resistant integrity of the cathode current collector.

In the presently contemplated best mode of the present invention, the cathode current collector is a tubular structure comprised of a free-standing porous graphite tube having a thickness of less than approximately 5-10 mils; a molybdenum layer having a thickness within the range of approximately 3-10 mils, chemically vapor deposited on the graphite tube; and, a tantalum layer having a thickness within the range of approximately 8-12 mils, chemically vapor deposited on the molybdenum layer. A cathode current collector/container constructed in this manner is characterized by minimum electrical resistivity, superior structural/mechanical strength, advantageously low weight, and long-term durability with minimum performance degradation (e.g., a 10+ year effective useful life over thousands of cycles). Alternatively, the cathode current collector of the instant invention may be embodied in a planar structural configuration.

BRIEF DESCRIPTION OF THE DRAWING

The FIGURE is a cross-sectional, elevational view of a Na/S cell incorporating a cathode current collector/container constituting a preferred embodiment of the present invention.

DETAILED DESCRIPTION OF THE PREFERRED EMBODIMENT OF THE INVENTION

With reference to the figure, there can be seen a sodium/sulfur (Na/S) cell 2 embodying preferred features of the instant invention, as will be fully developed in the ensuing discussion. The details of construction and principles of operation of Na/S cells are well-known in the art and are therefore not discussed herein, except to the extent necessary to facilitate an understanding of the presently contemplated best mode of practicing the inventive concepts disclosed herein. For a more comprehensive understanding of the construction and operation of Na/S cells, reference may be had to U.S. Pat. No. 4,460,662, issued to Damrow et al. or any of the numerous patents listed in Table 1 thereof. The principles of construction and operation as well as the unique advantages of Na/S batteries are also discussed in the publications entitled "Sodium-Sulfur Batteries," by Marcoux and Foo, Advan. Chem. Ser. No. 140,216 (1975); "The Sodium-Sulfur Battery" by J. L. Sudworth and A. R. Tilley, published by Chapman and Hall, New York (1985); and, "Rechargeable Batteries, Advances Since 1977," published by Noyes Data Corporation (1980).

The Na/S cell 2 is conveniently of conventional overall construction. In this regard, it should be immediately recognized that the particular type of overall cell construction employed is not limiting to the instant invention. Thus, it should be clearly understood that the Na/S cell 2 depicted in the Figure is merely illustrative of a typical cell environment suitable for utilization of a cathode current collector/container embodying the primary inventive concepts of the instant invention, as will be fully described hereinafter.

As shown in the Figure, Na/S cell 2 includes inner and outer tubular structures 3 and 4, respectively, arranged in spaced, concentric relation to thereby define a first annular chamber 6 therebetween. A second annular chamber 8 is defined by the interior surface of the inner tubular structure 3. The first annular chamber 6 comprises the cathode compartment of the cell 2, and the second annular chamber 8 comprises the anode compartment of the cell 2. The cathode compartment 6 contains liquid sulfur 10, which comprises the cathodic reactant of the cell 2. The anode compartment 8 contains liquid sodium 12, which comprises the anodic reactant of the cell 2. The outer tubular structure 4 comprises the cathode current collector/container of the cell 2, and constitutes the primary aspect of the instant invention. The construction of the cathode current collector/container 4 is in accordance with the principles of the instant invention to be fully described in a subsequent portion of this discussion. The inner tubular structure 3 comprises a tubular solid electrolyte of any convenient type well-known in the art, e.g., a ceramic type made of beta-alumina or the like. The solid electrolyte 3 functions as a solid barrier to mass liquid transfer that is selectively ionically conductive with respect to cations of the anodic reactant, i.e., sodium cations, and substantially impermeable to ions stored in the cathodic reactant, e.g., sulfur anions. Further, the solid electrolyte tube 3 and the cathodic reactant 10 together provide a sufficient barrier to free electron flow in the internal portion of the cell 2 to permit a difference of electric potential to develop at the respective electrodes thereof, during operation, as will also be fully described in a subsequent portion of this discussion.

The solid electrolyte 3 and the cathode current collector 4 are securely joined together by any convenient means well-known in the art for sealingly closing off the upper end portion of the cathode compartment 6 in a manner which ensures the leakproof or fluid-tight integrity of the cell 2. For example, as shown in the Figure, an annular plug 16 is secured between the outer surface 18 of the electrolyte 3 and the upper surface 20 of the cathode current collector 4. The plug 16 may be sealingly attached to the electrolyte 3 and the cathode current collector 4 by mechanical means (not shown) and/or by means of welding, brazing, soldering, fritting, or otherwise hermetically sealing the joints formed therebetween in any convenient manner well-known in the art. The plug 16 is preferably made of ceramic or any other suitable electrically and ionically nonconductive, corrosion-resistant material for electrically isolating the electrolyte 3 and the cathode current collector 4. Additionally, a generally disc-shaped cover plate 22 made of any convenient corrosion-resistant, preferably electrically insulating material, such as a ceramic or other like material, is sealingly secured to the upper surface 24 of the plug 16 in any convenient manner well-known in the art, in order to close off the upper end portion of the anode compartment 8. An anode terminal 26 is secured to the cover plate 22. The anode terminal 26 includes a current collector pole or rod 28 inserted through an aperture 30 provided in the cover plate 22, e.g., in the central region thereof, and extending into the liquid sodium 12 confined within the anode compartment 8. The annular joint formed between the circumferential wall defining the aperture 30 and the circumferential outer surface of the rod 28 is sealed by any convenient means well-known in the art, e.g., with a refractory material seal, such as a glass seal. As is clearly shown in the Figure, the solid electrolyte tube 3 is held suspended interiorly of the cathode current collector/container 4 by means of the load-bearing structural support provided by the plug 16, the cover plate 22, and the cathode current collector/container 4, with the closed bottom end 34 of the electrolyte tube 3 being spaced from the closed bottom end 36 of the cathode current collector/container 4. Thus, the cathode compartment 6 formed between the electrolyte tube 3 and the container 4 can be seen to have a generally U-shaped cross-section. Further, a cathode terminal 38 is provided on the bottom end of the cathode current collector/container 4. The anode and cathode terminals 26, 38 are electrically connected by lead wires (not shown), to an external electrical circuit (not shown).

It will be readily appreciated by those skilled in the art that the above-described overall general structural configuration of the Na/S cell 2 is merely illustrative, and that many alternative structural configurations of the cell 2 are readily available including, without limitation, those disclosed in U.S. Pat. Nos. 4,413,043, issued to Steinleitner et al.; 4,166,156, issued to Ludwig,; 1,510,217, issued to Kagawa et.; and , 4,407,912, issued to Virkar et al., all of whose teachings are herein incorporated by reference.

In operation, the Na/S cell 2 functions in a well-known manner to supply electrical power via the external circuit (not shown) electrically connected between the cathode terminal 38 and the anode terminal 26. Na/S cells typically exhibit a specific energy of approximately 80 watt-hours per pound, and a maximum power density of approximately 100–120 watts per pound. In general, the Na/S cell 2 operates in the following way to store and deliver electrical energy. The temperature of the anode and cathode compartments 6, 8, is raised to and maintained at an elevated, operating temperature of approximately 300° C.–350° C. by any convenient means (not shown) well-known in the art, e.g., joule heating, induction heating, or heat exchange with a suitable fluid. This elevated, operating temperature is above the melting point of the anodic and cathodic reactants (i.e., the sodium 12 and sulfur 10) confined by the anode and cathode compartments 6, 8, respectively, thereby maintaining the sodium 12 and sulfur 10 in a molten state during operation of the cell 2. During a discharge cycle of the cell 2, the molten sodium 12 gives up electrons to the external circuit, thereby yielding sodium cations which diffuse through the electrolyte 3 and into the cathode compartment 6, where the sodium cations combine with sulfur anions which are produced in a region immediately adjacent to the surface of the electrolyte 3, to yield sodium polysulfides $Na_2 S_x$. With increasing degrees of discharge, the sequence of the sodium polysulfides produced is $Na_2 S_5$, $Na_2 S_4$, and $Na_2 S_3$.

The above-described electrochemical reaction is reversible, thereby facilitating recharging of the cell 2. More particularly, during a charge cycle, an externally applied voltage causes the sodium polysulfides to decompose to yield sodium cations and sulfur anions, with the sodium cations diffusing back through the electrolyte 3 and back into the anode compartment 8 to unite with electrons therewithin, to thereby form elemental sodium. Thus, the cell 2 is rendered capable of storing electrical energy for subsequent usage via discharge cycling. Further, as is also well-known in the art, the Na/S cell 2 can be electrically connected together, in series or parallel, with other Na/S cells (not shown) to form a multi-cell battery for delivery of either high voltage or high current electrical power, respectively.

In accordance with the primary aspect of the present invention, the cathode current collector/container 4 is constructed in the following manner. More particularly, as can also be clearly seen in the Figure, the cathode current collector/container 4 is of a multilayer tubular construction comprised of a thin, highly corrosion-resistant inner layer 44 constituted of porous graphite; a thin, highly corrosion-resistant intermediate layer 46, comprised of molybdenum, intimately bonded to the graphite inner layer, preferably, by means of chemical or vacuum vapor deposition; and, in the presently contemplated best mode of the instant invention, a structural, load-bearing outer layer 48 comprised of tantalum. The graphite inner layer 44 is directly exposed to the hostile environment of the cathode compartment 6, and therefore, serves as the primary corrosion protection for the cathode current collector/container 4 against the molten sulfur/sodium polysulfides present within the cathode compartment 6. As is already well-known, graphite is virtually impervious to these cathodic reactant materials over long periods of time (e.g., 10-12 years) with little or no degradation. The inner layer 44 must also be electrically conductive and, therefore, as thin as possible in order to minimize the electrical resistance thereof. More particularly, it is preferable to utilize a graphite inner layer 44 having a maximum thickness of approximately 10 mils, and preferably, a thickness of no more than about 5 mils.

In the presently contemplated best mode of the instant invention, the graphite inner layer 44 is embodied as a free-standing, porous graphite tube. The porosity of the graphite allows for the molybdenum constituting the intermediate layer 46 to deeply and extensively penetrate into and throughout the graphite inner layer 44, in order to thereby provide a firm, highly adherent, intimate bonding together of the inner graphite layer 44 and the intermediate molybdenum layer 46. This intimate bonding together of the inner and intermediate layers 44, 46 is preferably achieved by chemically vapor depositing molybdenum onto the graphite inner layer 44. Since molybdenum is also highly corrosion resistant to the sulfur/sodium polysulfide materials contained within the cathode compartment 6, it, therefore, serves as excellent secondary corrosion protection for the cathode current collector/container 4.

Molybdenum also provides excellent electrical and thermal conductivity and, therefore, could possibly be made thick enough to provide the primary structural support for the cathode current collector/container 4, and thus, for the cell 2. In such an embodiment, the molybdenum layer 46 would serve as the outer layer of the cathode container 4. However, in the presently contemplated best mode of the instant invention, the molybdenum intermediate layer 46 is relatively thin and preferably, between 3-10 mils thick, in order to render the chemical vapor deposition of the molybdenum onto the graphite tube more practically feasible. Instead, it is presently preferred to employ the additional, outer layer 48 constituted of a material which is substantially structurally stronger (i.e., ductile) than molybdenum, especially in applications, e.g., spacecraft applications, in which the cell 2 will be subjected to rather extreme mechanical loadings, e.g., mechanical shock on the order of 30 g., half sine, 8 milliseconds in each of the three principal axes (not shown) of the spacecraft (not shown), over a long, e.g., 10 year, cycle life. Further, in such applications, the cathode container 4 must also be able to withstand recurring temperature conditions of 25° C. to 600° C., with 100° C./minute temperature gradients, over an approximately 10 year cycle life. Accordingly, tantalum is the presently preferred material for the outer layer 48, due to its superior structural strength and easy weldability to other components of the cell 2. In this regard, tantalum is stronger and more easily weldable than molybdenum. Additionally, tantalum was chosen because of its superior bondability to molybdenum. Preferably, the tantalum constituting the outer layer 48 is chemically vapor deposited onto the molbdenum intermediate layer 46 in order to effectuate firmly adherent, intimate bonding together of the intermediate and outer layers 46, 48, respectively. In this manner, an integral cathode current collector/container structure is achieved, which is especially desirable in spacecraft applications, in which the cathode current collector/container 4 must withstand the above-stated mechanical loading and temperature conditions over an extended period of time (e.g., 10 years) with no or very little structural damage or delamination, which if not prevented could cause cell leakage, rupture and/or unacceptable cell performance degradation. The capability of the cathode container 4 to withstand these temperature conditions is further enhanced by the coefficient of thermal expansion (CTE) compatibility of the graphite and molybdenum layers 44, 46 and the molybdenum and tantalum layers 46, 48. Moreover, the tantalum outer layer 48 can meet the above criteria while simultaneously being kept as thin as possible, preferably approximately 8-12 mils thick, so as to render the cell 2 as lightweight as possible, which is a significant consideration in spacecraft applications. However, in applications where these working conditions are not this severe, it may be feasible to forego the outer layer 48. Further, materials other than tantalum may be employed for the outer layer 48, as long as the material is electrically conductive, bonds well to molybdenum, and has sufficient structural strength for the intended application of the cell 2. For example, niobium constitutes a suitable substitute for tantalum.

Moreover, it should be clearly understood that the instant invention, in its broadest sense, encompasses a cathode current collector which is comprised of only the graphite inner layer 44 and the molybdenum intermediate layer 46, which may be employed as a cathode container liner or as the cathode container itself. Further, the cathode current collector/container 4 may be fabricated as a planar, rather than as a tubular structure, for use in planar Na/S cells such as are taught in U.S. Pat. Nos. 3,765,945 and 3,783,024, for example, as will be apparent to those skilled in the art. Yet further, although the graphite inner layer 44 is preferably a freestanding graphite tube of unitary construction including the closed bottom end 34, it should be clearly understood that a cylindrical sleeve (not shown), and a separate, either fixably or removably attached bottom plate (not shown), or other alternative assemblies may be employed instead, as will also be apparent to those skilled in the art.

Also, although the cathode current collector/container of the present invention has been described as being utilized in a Na/S cell, it should be understood that it may be utilized in any other type of electrochemical cell, e.g., alkali metal/sulfur cells which employ an anodic reactant other than sodium, e.g., potassium, lithium, or other alkali metals or alkali metal alloys, or mixtures thereof.

Additionally, the inner surface of the graphite inner layer 44, which is in contact with the sulfur/sodium polysulfides contained within the cathode compartment 6, may also be provided with a coating (not shown) of a sealant material which is suitable for sealing off any pores of the graphite inner layer 44 which may not be completely filled by the molybdenum intermediate layer 46. Of course, the sealant material should be capable of providing excellent corrosion resistance to the sulfur/sodium polysulfides contained within the cathode compartment 6, in order to maintain the integrity of the corrosion barrier provided by the combination of the graphite inner layer 44 and the molybdenum intermediate layer 46, i.e., to prevent any sulfur/sodium polysulfides from ever reaching the tantalum outer layer 48 during the entire service life of the cell 2, as this could result in performance degradation (e.g., due to increased internal cell impedance) and possibly, complete failure of the cell 2. In the presently contemplated best mode of carrying out this optional feature of the present invention, a pyrolitic graphite coating or film (not shown) is deposited onto the inboard surface of the graphite inner layer 44, in any convenient manner well-known in the art, e.g. as taught in U.S. Pat. Nos. 4,166,156, issued to Ludwig, 4,290,192, issued to Elkins, or 4,497,882, issued to Mikkor. For a more in-depth treatment of various pyrolytic graphite and carbon coating techniques, reference may be made to *Applied Spect.*, 32,402 (1978) and *Atomic Absorption Newsletter*, 15,42 (1976). In essence then, the graphite inner layer 44 is impregnated with a pyrolitic carbon or graphite coating via its inner surface, and a layer 46 of molybdenum via its outer surface, in this embodiment of the present invention.

Although a presently preferred embodiment of the present invention invention.

Although a presently preferred embodiment of the present invention has been described in detail, it should be clearly understood that many variations and/or modifications of the basic inventive concepts herein taught which may appear to those skilled in the pertinent art will fall within the spirit and scope of the present invention, which should be interpreted on the basis of the following claims.

What is claimed is:

1. A cathode current collector for use in an electrochemical battery, including:
   a first layer, consisting graphite; and,
   a second layer, consisting molybdenum, securely bonded to said first layer.

2. The collector as set forth in claim 1, wherein said graphite of said first layer is porous.

3. The collector as set forth in claim 2, wherein said molybdenum second layer is securely bonded to said porous graphite first layer by means of a chemical vapor deposition process.

4. The collector as set forth in claim 3, wherein said porous graphite first layer has a thickness of less than approximately 10 mils.

5. The collector as set forth in claim 4, wherein said molybdenum second layer has a thickness within the range of approximately 3-10 mils.

6. The collector as set forth in claim 5, further including a third layer constituted of a structurally rigid, electrically conductive material securely bonded to said molybdenum second layer by means of a chemical vapor deposition process.

7. The collector as set forth in claim 6, wherein said material of said third layer consists of tantalum having a thickness approximately within the range of 8-12 mils.

8. The collector as set forth in claim 3, further including a third layer consisting of a structurally rigid, electrically conductive material securely bonded to said molybdenum second layer, thereby enabling the collector to also serve as a cathode container for the electrochemical battery.

9. The collector as set forth in claim 8, wherein said material of said third layer consists of tantalum.

10. The collector as set forth in claim 9, wherein said tantalum third layer is securely bonded to said molybdenum second layer by means of a chemical vapor deposition process.

11. The collector as set forth in claim 8, wherein said material of said third layer consists of niobium.

12. The collector as set forth in claim 8, wherein said first, second, and third layers are of a generally cylindrical construction having a closed bottom end.

13. The collector as set forth in claim 8, wherein said first, second, and third layers are of a generally planar construction.

14. The collector as set forth in claim 8, wherein the electrochemical battery comprises an Na/S battery.

15. The collector as set forth in claim 3, further including a protective coating of sealant material deposited at least partially within pores of said porous graphite first layer for thereby at least substantially closing off said pores.

16. The collector as set forth in claim 15, wherein said protective coating consists of a material selected from a group including graphite and carbon.

17. The collector as set forth in claim 16, wherein said material selected from said group consisting of graphite and carbon is deposited within said pores of said porous graphite first layer by means of a pyrolitic deposition process.

18. The collector as set forth in claim 3, wherein said porous graphite first layer comprises a free-standing porous graphite tube having a closed bottom end.

19. The collector as set forth in claim 2, wherein said molybdenum second layer is securely bonded to said porous graphite first layer by means of a deposition process which facilitates penetration of said molybdenum into said porous graphite through pores of said porous graphite.

20. The collector as set forth in claim 1, further including a third layer, consisting of tantalum, securely bonded to said second layer.

* * * * *